(12) United States Patent
Holland et al.

(10) Patent No.: US 7,356,638 B2
(45) Date of Patent: Apr. 8, 2008

(54) USING OUT-OF-BAND SIGNALING TO PROVIDE COMMUNICATION BETWEEN STORAGE CONTROLLERS IN A COMPUTER STORAGE SYSTEM

(75) Inventors: William G. Holland, Cary, NC (US); Shah Mohammad Rezaul Islam, Tucson, AZ (US); Greg S. Lucas, Tucson, AZ (US); Yoshihiko Terashita, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 11/248,559

(22) Filed: Oct. 12, 2005

(65) Prior Publication Data

US 2007/0083707 A1 Apr. 12, 2007

(51) Int. Cl.
*G06F 13/00* (2006.01)
*G06F 12/00* (2006.01)
*G06F 3/00* (2006.01)

(52) U.S. Cl. .................... 710/316; 711/114
(58) Field of Classification Search ............. 710/316, 710/240, 74, 300, 3, 36, 38, 314, 315; 711/151, 711/114, 154, 203; 714/5, 6, 43; 370/351, 370/431, 464, 906, 910
See application file for complete search history.

(56) References Cited

U.S. PATENT DOCUMENTS 5,724,352 A * 3/1998 Cloonan et al. ............ 370/388
6,006,189 A * 12/1999 Strawczynski et al. ...... 704/270
6,532,547 B1 * 3/2003 Wilcox ........................... 714/5
6,647,387 B1 * 11/2003 McKean et al. ............... 707/9
6,816,905 B1 * 11/2004 Sheets et al. ............... 709/226
7,043,665 B2 * 5/2006 Kern et al. ..................... 714/5
2003/0115413 A1 6/2003 Wood et al.
2004/0148477 A1 * 7/2004 Cochran ..................... 711/162
2004/0193737 A1 * 9/2004 Huffman et al. ............... 710/1
2005/0021847 A1 1/2005 Rothman et al.
2005/0102468 A1 * 5/2005 Delaney et al. ............. 711/114
2005/0102549 A1 * 5/2005 Davies et al. .................. 714/4
2005/0138258 A1 * 6/2005 Seto ............................ 710/301
2005/0251588 A1 * 11/2005 Hoch et al. ..................... 710/5
2007/0083707 A1 * 4/2007 Holland et al. ............. 711/114

OTHER PUBLICATIONS

"Unified power quality conditioner for improving power quality using ANN with hysteresis control" by Tey et al., unknown date.*
"Working Draft Serial Attached SCSI-1.1 (SAS-1.1)", revision 9e, Jul. 24, 2005 and published by T10, a technical subcommittee of the Int'l Committee for Information Technology Standards (Sect. 6.6).

* cited by examiner

*Primary Examiner*—Gopal C. Ray
(74) *Attorney, Agent, or Firm*—Quarles & Brady LLP

(57) ABSTRACT

A system provides communication between components of a computer data storage system using out-of-band (OOB) signaling. The system includes a plurality of data storage devices having a local controller for directing data flow to each of the plurality of data storage devices. A switch is coupled to the local controller to direct data to the set of the plurality of data storage devices. First and second initiators are coupled to the switch. The first initiator communicates the OOB signals through the switch alternatively to the local controller or to the second initiator.

8 Claims, 3 Drawing Sheets

USING OUT-OF-BAND SIGNALING TO PROVIDE COMMUNICATION BETWEEN STORAGE CONTROLLERS IN A COMPUTER STORAGE SYSTEM

BACKGROUND OF THE INVENTION

1. Field of the Invention

The present invention relates in general to computer equipment and, more particularly, to an apparatus and method of providing communication between RAID controllers in computer storage systems.

2. Description of the Prior Art

Computer storage systems typically include one or more high-capacity disk arrays for storing digital information. Commonly, the disk arrays are arranged in a redundant array of independent disks (RAID) topology. The RAID topology provides stability, security and redundancy as to the computer storage system. A disk system with RAID capability can protect its data and provide on-line, immediate access to its data, despite a single (some RAID storage systems can withstand two concurrent disk failures) disk failure. RAID capability also allows for the use of a number of less expensive disks while providing increased storage capacity. A common RAID topology includes the use of one or more RAID controllers, which serve to channel data flow to a particular disk in the array while coordinating data transfer across the entire array among other functions.

In computer storage systems, the need for built-in redundancy is very desirable. As a result, a computer storage system with RAID capability can include two or more RAID controllers, or initiators. If a first RAID controller fails for any reason, then a second RAID controller can be employed to take on the first controller's functions, a process which is commonly known in the industry as "fail over", and "fail back" when function to the first RAID controller is restored.

In an example dual redundant RAID controller storage system, communication is required between the first and second RAID controllers. The communication between RAID controllers ensures redundancy in the event of a failover. This communication can be accomplished by a variety of low-level interfaces, such as PCI, I²C or Ethernet. In some computer systems, however, a generic high-speed fabric connects computing components. For example, the high-speed fabric can connect a RAID controller with a set of storage devices. The low-level communication between RAID controllers is typically not performed over the high speed fabric. An additional connection, such as the installation of an external cable between RAID controllers, must be made. The requirement of an additional connection between RAID controllers adds extra complexity in the design process and cost in the manufacturing process.

Thus, a need exists for an apparatus and method of communication between individual RAID controllers in a multi-controller RAID or similar topology mass storage system of an overall computer system.

SUMMARY OF THE INVENTION

In one embodiment, the present invention is a system for providing communication between components of a computer data storage system using out-of-band (OOB) signaling, comprising a plurality of data storage devices having a local controller for directing data flow to each of the plurality of data storage devices, a switch coupled to the local controller to direct data to the plurality of data storage devices, and first and second initiators coupled to the switch, wherein the first initiator communicates the OOB signals through the switch alternatively to the local controller or to the second initiator.

In another embodiment, the present invention is a system for providing communication between controllers in a Redundant Array of Independent Disks (RAID) topology, comprising a plurality of devices configured in the RAID topology for storing data, a switch coupled to the plurality of devices for routing the data, and first and second RAID controllers for directing data to the plurality of devices, wherein the first RAID controller sends an out-of-band (OOB) communication signal through the switch to the second RAID controller.

In still another embodiment, the present invention is a method for performing a failover in a dual redundant RAID controller storage system, comprising sending a predetermined sequence of out-of-band (OOB) communication signals from a first RAID controller through a switch to a second RAID controller, wherein the second RAID controller initiates a control sequence to perform a function of the first RAID controller in response to received OOB signals.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
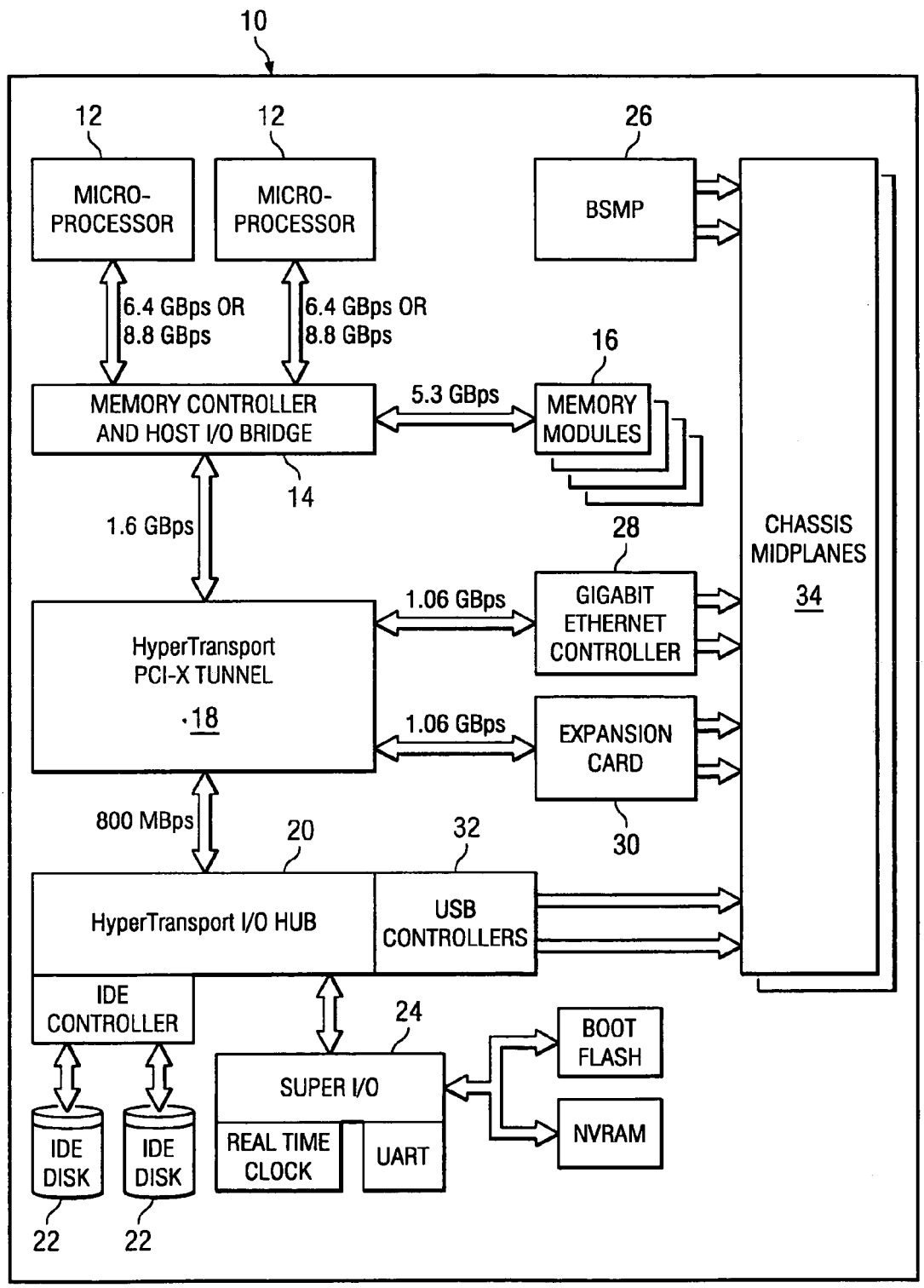
FIG. 1 illustrates an example architecture of a blade server for use in a computer system.

Turning to FIG. 1, an example architecture of a typical blade server for operation in a computer system is shown. Buses, interfaces, or similar connections between components are depicted with arrows as shown, as are example data rates. Server 10 includes dual microprocessors 12, a memory controller and I/O bridge 14, onboard memory 16, PCI interface 18, I/O hub 20 and IDE disks 22. Blade server 10 includes subcomponents as part of the BIOS 24. Various components of server 10 enable server 10 to communicate with external components in the larger computer system in which server 10 is designed to operate. Ethernet controller 28, expansion card 30, USB controllers 32 and a blade server management processor (BSMP) are shown coupled to chassis midplanes 34. Chassis midplanes 34 serve as connection points for a plurality of servers 10 to a larger overall computer system. For example, a number of servers 10 containing microprocessors, or processor blades can be connected to a plurality of chassis midplanes 34. Chassis midplanes 34 can be mounted in a rack mount enclosure which can house a plurality of servers 10. In addition to processor blades comprising servers 10, blades which carry control or storage devices are contemplated. A variety of generic high speed interfaces can be wired or otherwise coupled to chassis midplanes 34.

Figure 2A:
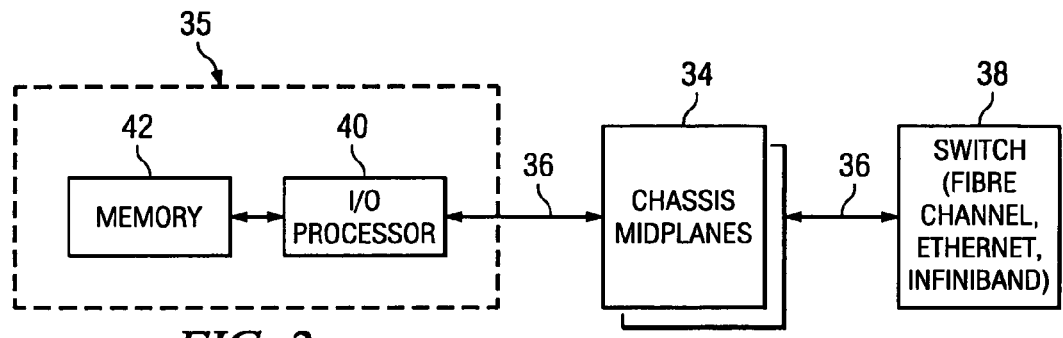
FIG. 2a illustrates a RAID controller for use in a blade server computer system.

FIG. 2a illustrates an example RAID controller blade 35 which can be integrated into the rack mount enclosure by coupling to midplanes 34. A generic high speed fabric or interface 36 can connect controller blade 35 to a switch 38. Switch fabrics 36 are integrated into the midplanes 34. Switch fabrics 36 can facilitate the transfer of a plurality of high speed signals routed from each of the blade slots in the rack mount enclosure to a set of switches 38 that are installed in the rear of the chassis. The midplane 34 wiring 36 is generic in the sense that a user can install different switch modules to personalize the fabric for a specific technology that the blades support, e.g., fiber channel switches, Ethernet switches or Infiniband switches. A Serial Attached SCSI (SAS) switch can be used to interconnect the blades to SAS storage which can be located on a separate blade in the system.

Referring again to FIG. 2a, controller blade 35 includes I/O processor 40 which is coupled to memory 42. Interface 36 couples controller blade 35 with midplane 34. Controller blade 35 can operate in a manner similar to typical RAID controllers. Control blade 35 can determine which of a plurality of storage devices is to receive data. The data can then be sent to the appropriate device. While a first device is writing the data, controller blade 35 can send a second portion of data to a second device. Controller blade 35 can also read a portion of data from a third device. Simultaneous data transfers made possible by controller 35 allow for faster performance.

Figure 2B:
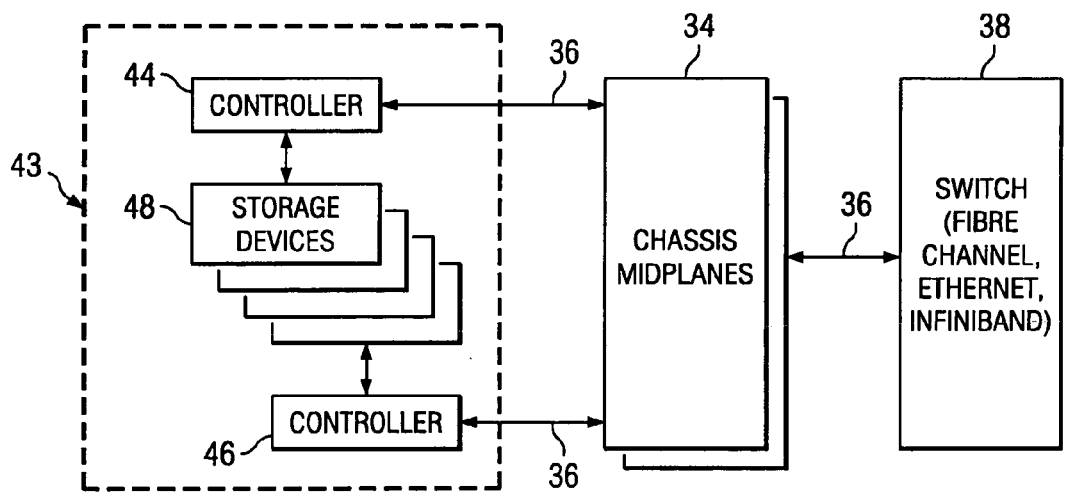
FIG. 2b illustrates a mass storage system for use in a blade server computer system.

FIG. 2b illustrates an example storage blade 43 which can be integrated into the rack mount enclosure by coupling to midplane 34. Again, high speed fabric 36 is shown coupling switch 38 to midplane 34. Additionally, storage blade 43 is coupled by interfaces 36 to midplane 34. Controller 44 and controller 46 are depicted as local to storage blade 43. Controllers 44 and 46 are coupled to a plurality of storage devices 48. Storage devices 48 can be an array of disk drives, such as a "Just-a-Bunch-Of-Drives" (JBOD) topology.

In various mass storage embodiments such as storage devices 48 and storage blade 43, the mass storage components can include the appropriate functionality to communicate over various device located layers such as an application layer, a transport layer, a link layer, and/or a physical layer, in accordance with various industry specifications, some of which have been previously described. For example, storage devices 48 can provide the functionality to communicate via layers in accordance with a Serial-ATA industry standard interface specification, such as the Serial-ATA I interface specification (SATA) promulgated by the Serial ATA Working Group, the Serial ATA II interface specification promulgated by the Serial ATA II Work Group, or the SAS specification promulgated by the Serial Attached SCSI Working Group, or any progeny of these specifications.

Because high-speed fabric 36 uses a generic interface, a variety of blades, including processor, controller and storage blades can be interconnected to midplanes 34. The fabrics 36 allow the variety of blades to communicate with switches 38. However, because fabric 36 is generic, a blade-to-blade communication path is commonly not available. It is not practical to pre-define specific inter-blade communication interfaces.

To realize communication between dual RAID controllers in an environment where a processor blade 10 is interconnected with a controller blade 35 and storage blade 43 via fabrics 36, a scheme can be implemented which uses an out-of-band (OOB) method of communication. As such, the respective interface specification employed, whether it be SATA I, SATA II, SAS or otherwise, can include a physical layer on which OOB signaling may be communicated to establish a communication link between RAID controllers 35, switches 38 and storage devices 48. As used herein, the term out-of-band signaling refers to any transmission of signals or information that takes place using frequencies or channels outside the normal frequencies or channels used for transfer of I/O commands and user data to and from storage devices 48.

In one example, controller blade 35, switch 38 and storage blade 43 can include means that is operable to send and receive OOB signals over the physical layer. The means to send and receive OOB signals can be provided by hardware located on controller 35, switch 38 and/or storage blade 43, software, and/or firmware or a combination that is suitable to perform the sending and receiving function.

OOB signals can be low-speed signal patterns that do not appear in normal data streams, as previously discussed. OOB signals generally consist of defined amounts of idle time followed by defined amounts of burst time. During the burst time, the physical link carries signal transitions. The signals are differentiated by the length of idle time between the burst times. Included in the SATA standard are two predefined OOB signals: COMINIT/COMRESET and COMWAKE. An additional SAS standard-specific OOB signal COMSAS is predefined. The use of these predefined OOB signals, including detection, transmission and reception are defined in section 6.6 of the SAS specification document "Working Draft Serial Attached SCSI-1.1 (SAS-1.1)", revision 9e, 24 Jul. 2005 and published by T10, a technical subcommittee of the International Committee for Information Technology Standards (INCITS) which is incorporated herein by reference.

Figure 3:
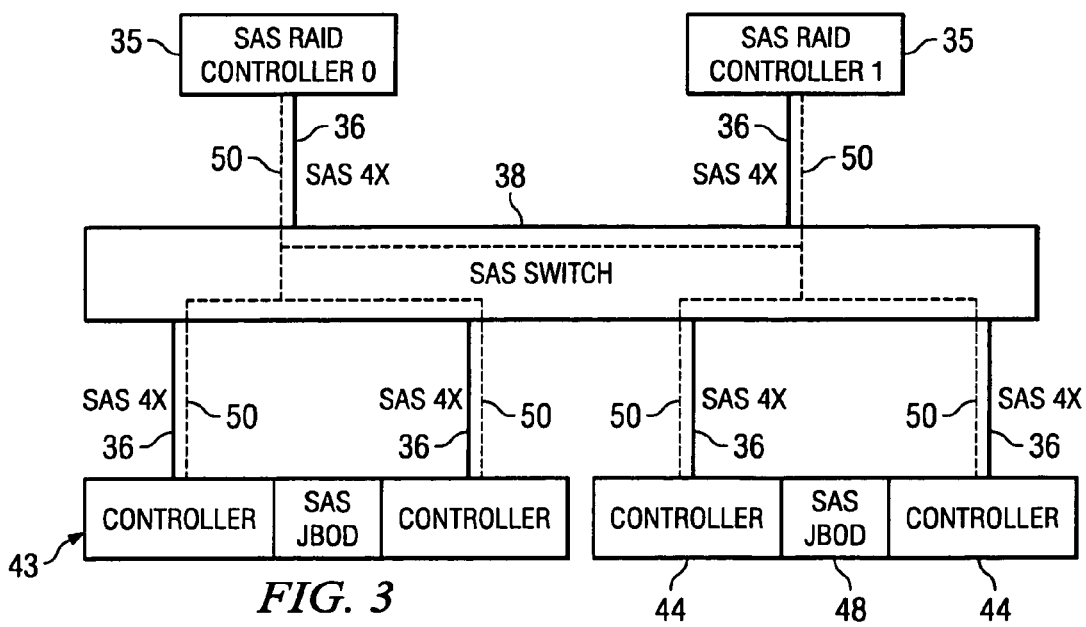
FIG. 3 illustrates out-of-band (OOB) communication over a dual-redundant RAID controller topology over a Serial Attached SCSI (SAS) protocol.

Referring to FIG. 3, communication using OOB over an SAS interface is depicted in a conceptual diagram. Dual redundant SAS RAID controllers 35 are depicted. Generic high-speed fabrics 36, shown as a solid line, couples controllers 35 to SAS switch 38. Fabrics 36 are also shown coupling switch 38 with storage blade 43 which is also representative of controllers 44 and 46 and plurality of storage devices 48. In the depicted example, storage devices consist of two sets of SAS JBODs. OOB signals 50 are represented as dotted lines. Signals 50 are intended to physically travel over the fabrics 36.

In one embodiment, each RAID controller 35 contains a standard SAS expander module. The expander module can also be used in the SAS switch 38 and within the SAS JBODs 48. For RAID controller 35 to RAID controller 35 communication as shown, an OOB method of communication is realized in which each RAID controller 35 modulates the SAS interface using OOB techniques. SAS switch 38 as a central point can interpret such communication (between controllers 35). In additional embodiments, switch 38 can behave as the master of the OOB communication and relay information between the controllers 35. In a similar fashion, information can also be communicated to/from the SAS JBODs 48.

Figure 4:
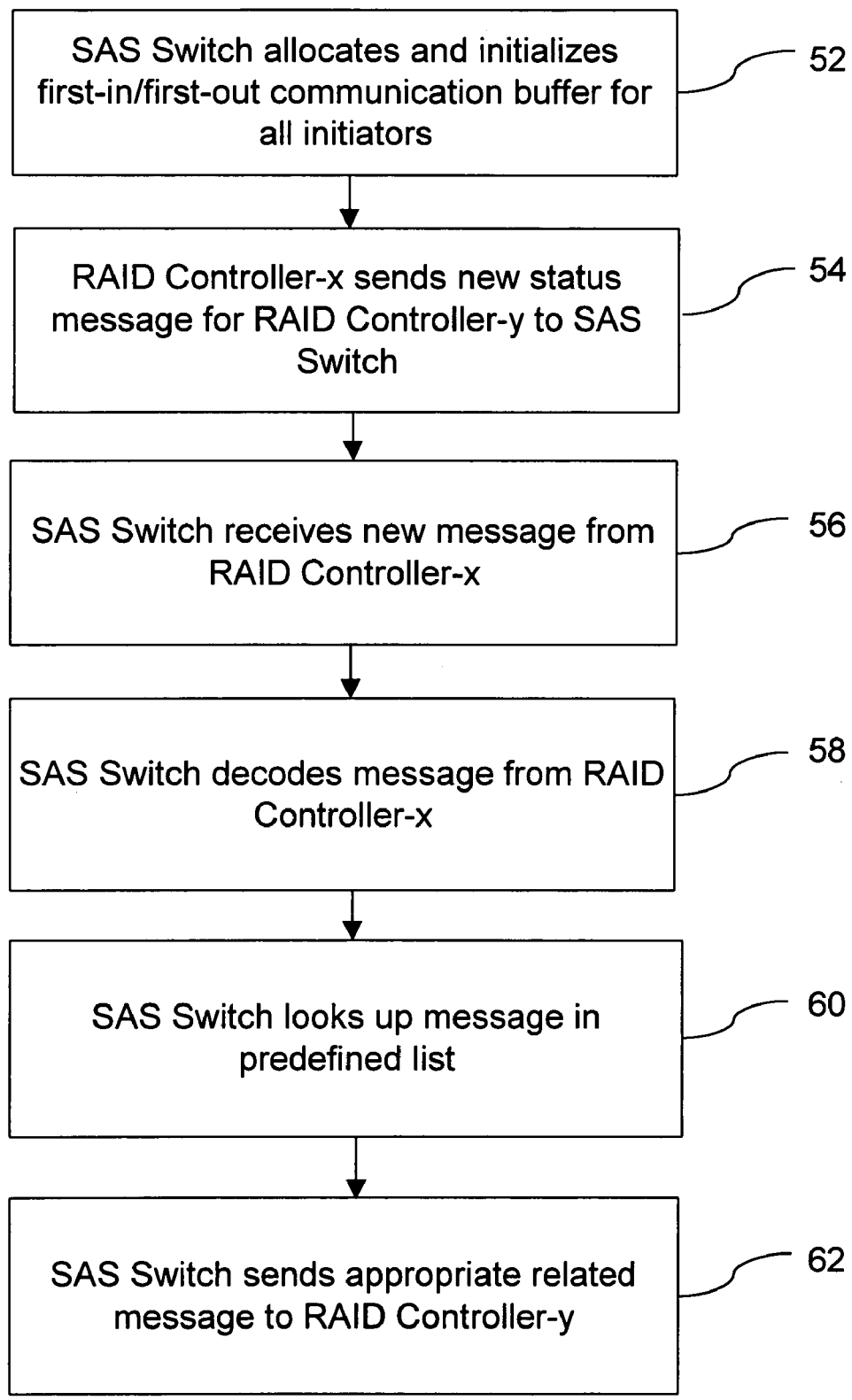
FIG. 4 illustrates an example OOB protocol over SAS between initiators and a SAS switch for exchange of information.

An example OOB protocol over SAS between initiators 35 and an SAS switch 38 for exchange of information is depicted in FIG. 4. In the following example, it is assumed that the SAS switch 38 coordinates all message traffic. Additionally, switch 38 is assumed to provide a shared communication buffer between components. A predefined list of messages is stored, the messages being specifically tailored to accommodate communications commonly seen in a dual redundant RAID controller storage system.

Those skilled in the art will appreciate that topologies, specifications, interfaces, software, firmware and hardware such as that mentioned above, is usually updated and that new versions, variations, or revisions may be created and promulgated over time. In this respect, various embodiments are not necessarily limited to any one particular version, variation or revision of the following example.

Referring again to FIG. 4, the depicted example protocol begins with step 52, where the SAS switch 38 allocates and initializes a first-in/first-out (FIFO) communication buffer for all initiators 35. The FIFO buffer can be used to temporarily store communications information. A first RAID controller 35 then sends a new status message for a second RAID controller 35 (denoted here as RAID controllers-x and y) to switch 38 in step 54. In the following step 56, switch 38 receives a new message from the first RAID controller 35. In step 58, switch 38 decodes the message from the first RAID controller 35. The switch 38 looks up the message in the predetermined list from memory in step 60. Step 62 concludes the example protocol where switch 38 sends the appropriate related message to the second RAID controller 35.

Using OOB techniques over an existing physical layer as shown can negate the requirement of an additional connection between initiators 35 and promote efficiency in design and manufacture. Additionally, the use of an OOB protocol in an example system can facilitate failovers and failbacks as previously discussed. For example, based on received OOB signals, a second RAID controller 35 can initiate a control sequence whereby the controller 35 takes control of the I/O operations and/or data transfer being handled by a failed first controller 35 to ensure redundancy.

While one or more embodiments of the present invention have been illustrated in detail, the skilled artisan will appreciate that modifications and adaptations to those embodiments may be made without departing from the scope of the present invention as set forth in the following claims.

What is claimed is:

1. A system for providing communication between components of a computer data storage system using out-of-band (OOB) signaling, comprising:
   a plurality of data storage devices having a local controller for directing data flow to each of the plurality of data storage devices;
   a switch coupled to the local controller to direct data to the plurality of data storage devices; and
   first and second initiators coupled to the switch, wherein the first initiator communicates OOB signals through the switch alternatively to the local controller or to the second initiator.

2. The system of claim 1, wherein the OOB signals conform to a serial attached SCSI (SAS) interface specification.

3. The system of claim 1, wherein the OOB signals conform to a serial-ATA interface specification.

4. The system of claim 1, wherein the set of a plurality of data storage devices is arranged in a concatenation or Just-a-Bunch-of-Disks (JBOD) topology.

5. The system of claim 1, wherein the first and second initiators comprise Redundant Array of Independent Disks (RAID) controllers.

6. The system of claim 1, wherein the first and second initiators are coupled to a generic high-speed fabric to transfer data to the set of the plurality of data storage devices.

7. The system of claim 6, wherein the generic high-speed fabric is integrated into a chassis midplane of a rack-mount computer system.

8. The system of claim 1 wherein the first initiator communicates OOB signals to the second initiator through the switch indicating a failure of communication between the first initiator and a local controller.

* * * * *